Oct. 27, 1936. G. I. GOODWIN 2,058,863
CLUTCH
Filed Jan. 15, 1931 4 Sheets-Sheet 1
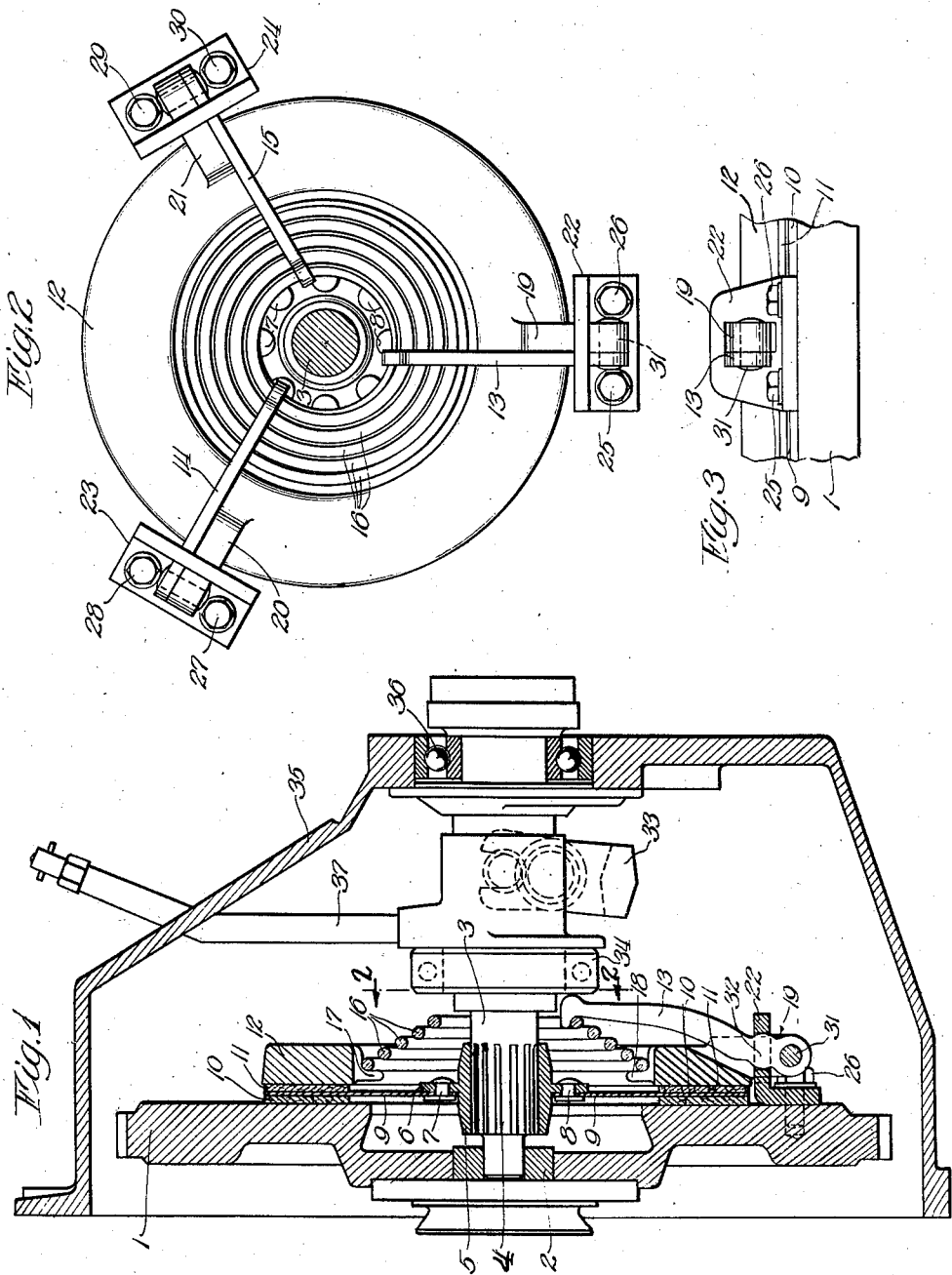
Inventor:
George I. Goodwin
By Brown, Jackson, Boettcher & Dienner
Attys.

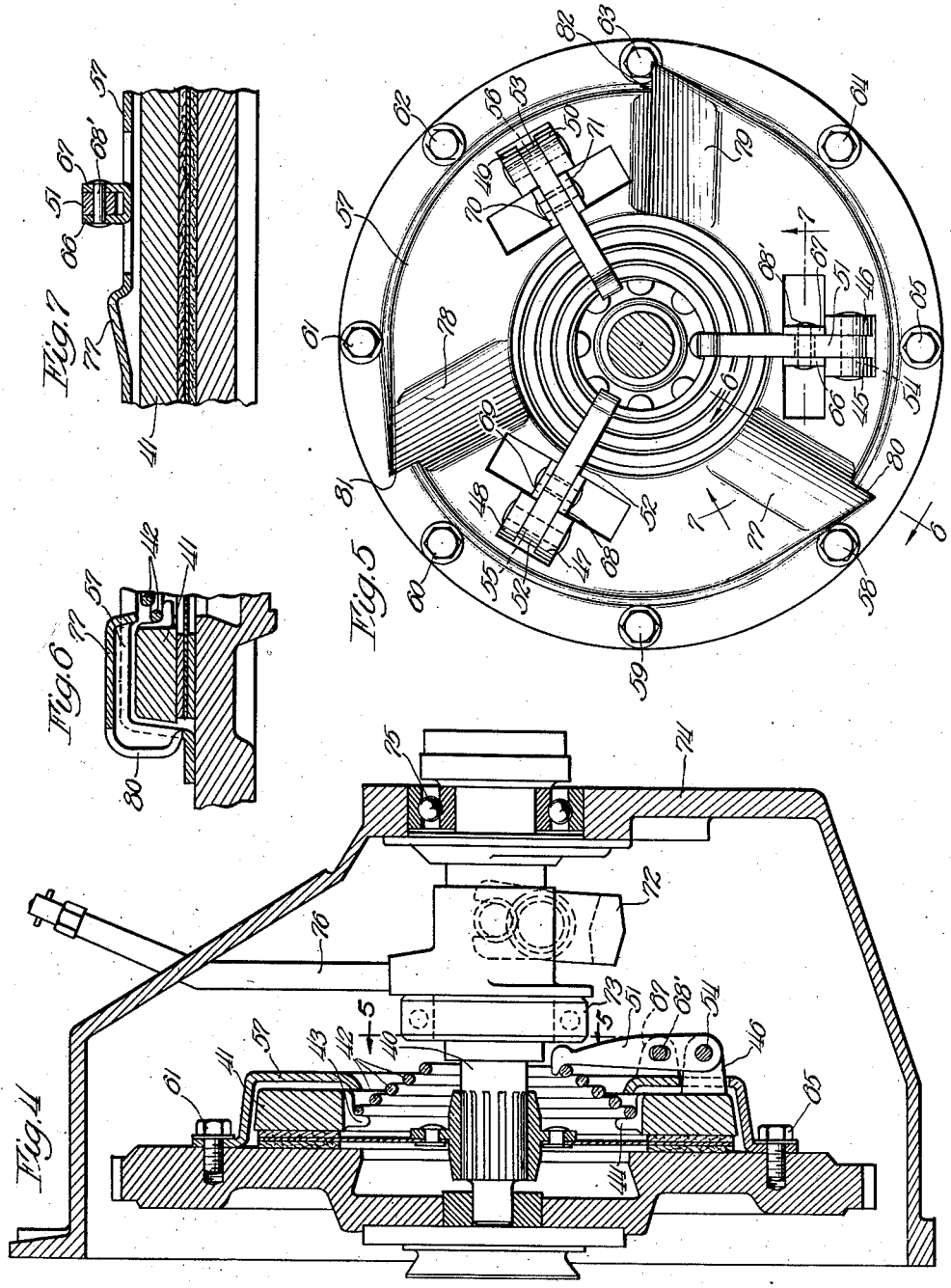

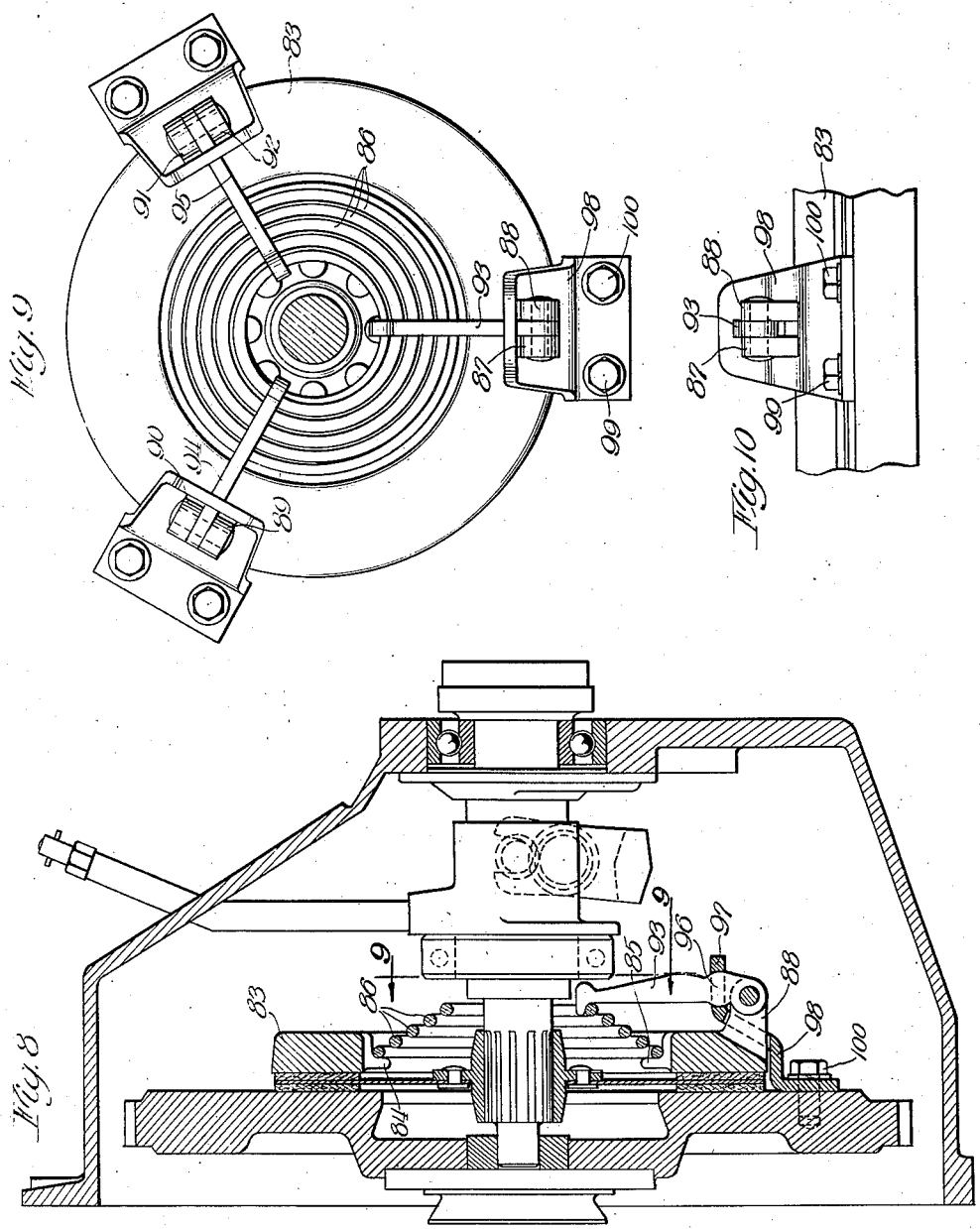

Oct. 27, 1936.  G. I. GOODWIN  2,058,863
CLUTCH
Filed Jan. 15, 1931.  4 Sheets-Sheet 4
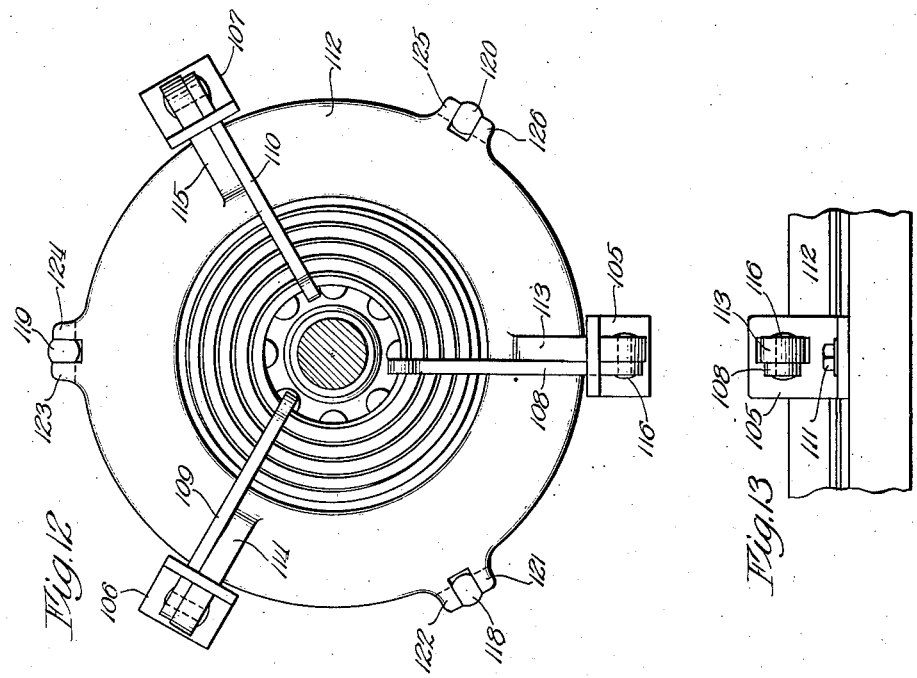
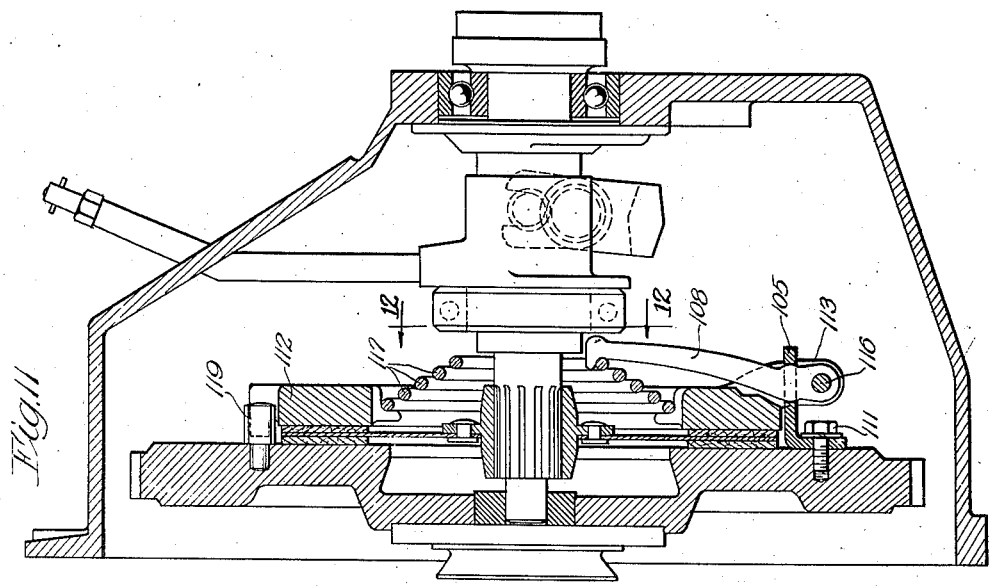
Inventor
George I. Goodwin
By Brown, Jackson, Boettcher & Dienner
Attys.

Patented Oct. 27, 1936

2,058,863

UNITED STATES PATENT OFFICE 2,058,863

CLUTCH

George I. Goodwin, Detroit, Mich.

Application January 15, 1931, Serial No. 508,820

34 Claims. (Cl. 192—68)

This invention relates to clutches, particularly to clutch constructions employed in connection with automobiles, and the principal purpose and object of this invention resides in the provision of simplified clutch mechanisms in which I have incorporated numerous improvements and novel features.

A clutch mechanism of the type disclosed in the present case represents a coupling for transmitting driving force from a driving member of an engine to a driven member. The clutch is interposed between the engine and the transmission system. The driven member may be a shaft disposed coaxially with the driving member of the engine which may be the fly wheel, and the clutch serves the purpose of securely coupling the driving and the driven members in operative engagement, and to permit uncoupling of these members whenever disengagement or discontinuance of the transmission of driving force is desired or required.

The purpose of a clutch of this character is well known and the above sketch of its general function is therefore deemed sufficient.

There are numerous clutch constructions in existence, showing how the desired result may be accomplished. The basic elements are in all prior constructions the same or similar, since it is in all cases desired to couple a given driving member with a given driven member. These basic elements include a coupling member which may be in relatively loose engagement with a driven member (which may be a shaft) and means for bringing this coupling member in frictional or other engagement with the driving member, thereby connecting the driven member in direct driving relation with the driving member. After this engagement is once established, a force peculiar to or included in the clutch mechanism furnishes power for maintaining the various parts in driving connection. In addition to the clutch mechanism proper and the parts as above intimated, there are means provided for actuating these parts so that engagement and disengagement of the clutch may be accomplished at will whenever it is desired and necessary.

As to the particular ways in which the above general objects are realized in prior constructions, they are too numerous to receive adequate mention within the scope of this specification, and I shall therefore confine myself to a discussion of the improvements which I have disclosed over existing structures.

Speaking in general, I have provided clutch mechanisms for transmitting driving force from a driving to a driven member, in which the general construction is simplified and rendered more reliable in operation. Production of my clutch is rendered cheaper due to simplified design of the various detail parts, and the assembly is simplified for the same reasons and also due to the novel way in which I combine the several parts in operative assembly. Although I have shown my novel clutches incorporated in structures which are particularly suitable in connection with automobiles, the application of the principles involved is by no means limited to clutches for automobiles, but the various features may as well be used in connection with clutches for installation in machinery of widely differing type and character. Generally speaking, the principles which I disclose may be employed advantageously in connection with most of the known types of clutches.

The invention may be realized in various ways. I have shown several embodiments which I will describe presently in detail. However, it will be advisable to discuss these embodiments briefly in a general manner, preparatory to presenting the detailed explanations.

The features which are common to all embodiments reside in the general structure of a unitary clutch mechanism comprising a pressure plate having extensions, levers mounted on each of these extensions, fixed members for attachment to the fly wheel cooperating therewith, whereby the extensions on the pressure plate pass through or extend through the members and spring means disposed directly between the levers and the pressure plate, in such a manner as to reduce the area of contact between the spring means and the pressure plate. The fixed members maintain the mechanism in unitary assembly also when dismounted from the fly wheel.

In one embodiment, I employ a simple angle bracket type of fixed member in combination with a single lever type of clutch.

In another embodiment I show a construction of members combined with a cover for the pressure plate. In other words, the members have been extended in this embodiment until they have become a cover for the clutch. The spring means reacts between the levers and the pressure plate as is also the case in other embodiments. The cover is attached to the fly wheel and is provided with louvers for forcing air into the clutch for cooling the same.

Still another embodiment discloses a structure in which the fixed members are formed so that the diametral clutch clearance is increased at the expense of the overall length of the mechanism.

In the above structures, these fixed members also serve the purpose of driving the pressure plate, that is to say, of transmitting driving force from the fly wheel to the pressure plate.

In a further embodiment, I show a structure in which I have provided a separate set of driving pins attached to the fly wheel and cooperating with the pressure plate.

The above discussion describes broadly the outstanding structural aspects of the various embodiments which I have shown.

Now, before presenting the detailed description, I will briefly enumerate the salient objects and features of the invention so that the same may be readily understood and appreciated when described in the following detailed presentation and defined in the appended claims which are yet to follow.

One object of the invention is concerned with a clutch having a unitary structure of a mechanism comprising a pressure plate, levers thereon, and spring means disposed directly and solely between said pressure plate and said levers.

Another object resides in providing an operating mechanism for a clutch, comprising fixed members for attachment to a driving member, a pressure plate extending through said members, and levers pivotally connected with said pressure plate.

Still another object has to do with a clutch having a driving member, a driven plate for frictional engagement therewith, and an operating mechanism therefor, comprising a pressure plate, levers on said pressure plate, spring means disposed between said levers and said pressure plate, a cover for said mechanism, said cover being attachable to the driving member, and members on said cover for cooperating with said levers and with said pressure plate to secure said mechanism in unitary assembly when dismounted from said driving member.

A further object is realized in a clutch mechanism wherein members attached to a driving member cooperate with a pressure plate and with levers thereon, and louver means carried by said members for forcing air into said clutch for cooling purposes.

Another object is concerned with the construction of a clutch, comprising a driving member, a driven plate for frictional engagement therewith, a pressure plate for actuating said driven plate, lever means and spring means mounted on said pressure plate, and means for attachment to said driving member and cooperating with said lever means for actuating said pressure plate.

A further object relates to a clutch construction cooperating with a driving member, comprising a pressure plate, extensions thereon which project axially therefrom, levers mounted on said extensions, bracket means for attachment to said driving member and having fixed members thereon cooperating with said levers, said extensions on said pressure plate passing through said members, and spring means disposed directly between said levers and said pressure plate.

Still another object has to do with a clutch having a driving member and a driven plate for frictional engagement therewith, a pressure plate, operating mechanisms mounted thereon, means for attachment to said driving member cooperating with said operating mechanisms, and driving means for attachment to said driving member cooperating with said pressure plate.

The above statements recite the outstanding objects and features of the disclosure. There are other objects and features which will presently appear.

I shall now furnish a detailed description of the various embodiments of the invention so that others may be enabled to reproduce the same in practice. This detailed description is being rendered and should be read with reference to the accompanying drawings, in which:

Figure 1 shows a longitudinal section of a clutch in one embodiment, having a simple bracket type of fixed member through which the pressure plate projects or passes;

Figure 2 represents a transverse sectional view of the embodiment shown in Figure 1 taken along the line 2—2 of Figure 1;

Figure 3 illustrates an end view of one of the fixed members cooperating with the pressure plate and a lever;

Figure 4 is a longitudinal section of another embodiment of the invention corresponding to the view shown in Figure 1, but showing a mechanism in which the fixed members have spread out until they have become a cover for the clutch mechanism;

Figure 5 shows a transverse sectional view of the structure shown in Figure 4 taken along the line 5—5 of Figure 4;

Figure 6 illustrates a sectional view taken on the line 6—6 of Figure 5 and shows particularly the arrangement of the louver for blowing air into the mechanism to cool the same;

Figure 7 is a sectional view taken on line 7—7 of Figure 5 and illustrates further the relation of the louver and the abutment-bracket provision combined with the cover;

Figure 8 shows a longitudinal section of a further embodiment of the invention in which the diametral clutch clearance has been increased at the expense of the overall length of the clutch;

Figure 9 represents a transverse sectional view of the mechanism particularly shown in Figure 8 and taken along the line 9—9 of Figure 8;

Figure 10 is an end view of the abutment used in connection with the structure shown in Figures 8 and 9;

Figure 11 represents a longitudinal section of a further embodiment of the invention, in this case of a clutch structure in which I have provided separate driving pins. The fixed members in this embodiment serve merely the purpose of furnishing the reaction bases for the levers in the clutch engaging and disengaging operations;

Figure 12 is a transverse sectional view of the embodiment shown in Figure 11 and taken along the line 12—12 of Figure 11; and Figure 13 represents an end view of one of the abutments cooperating with a lever and with the pressure plate of the embodiment shown in Figures 11 and 12.

Referring now particularly to the structure shown in Figures 1, 2, and 3, numeral 1 represents a fly wheel which may be attached to the crank shaft of an engine. Rotatably journaled in this fly wheel, in a bearing which I have diagrammatically indicated at 2, is a driven shaft 3. This shaft is provided with a splined section designated by the reference numeral 4. Mounted on this splined section 4 of the driven shaft 3 is a hub 5 which is provided with a flange 6. Fastened to this flange 6 by means of rivets such as 7 and 8 is a driven plate 9 which may be of the well known flexible type. This driven plate, at its outer portion, is provided with a friction member 10 adapted to be brought in frictional engagement with the friction surface of the fly wheel 1. On the other side, opposite the friction member 10, is a friction member 11, and this latter friction member may be brought into frictional engagement with the pressure plate 12.

It will be evident that when a pressure is exerted on the pressure plate 12 in the direction of the fly wheel 1, the friction member 11 will be engaged by the pressure plate 12 and the friction member 10 will engage the friction surface of the fly wheel 1. Accordingly, driving force will be transmitted from the fly wheel by way of the driven plate 9 to the hub 5, and, since the hub 5 is attached to the splined section 4 of the driven shaft 3, this driving force will be directly transmitted to the driven shaft. The shaft 3 will, therefore, rotate with the fly wheel.

The clutch mechanism which is provided for accomplishing this frictional engagement of the driven plate 9 with the fly wheel 1 comprises the pressure plate 12, levers such as 13, 14 and 15, and the spring means mounted between the pressure plate 12 and the inner ends of these levers. The spring means is designated in the drawings by the reference numeral 16. One end of this spring 16 is mounted directly on the pressure plate 12 and the other end reacts against the levers 13, 14 and 15.

The mounting of the spring means is such that the area of contact between the spring and the pressure plate is reduced to a minimum. Accordingly, referring again to Figures 1 and 2, I have provided on the inner portion of the pressure plate 12 a number of extensions such as 17 and 18. These extensions radiate from the recessed inner portion of the pressure plate as shown and provide supports for mounting the spring 16.

The outer ends of the levers 13, 14 and 15 are pivoted on extensions 19, 20 and 21 which are disposed radially on the pressure plate 12 and are integral cast parts thereof. Thus, the lever 13 is pivoted on the extension 19 of the pressure plate 12; the lever 14 is pivoted on the extension 20 of the pressure plate 12; and the lever 15 is pivoted on the extension 21 of the pressure plate 12.

The force of the spring 16 tends to move the levers such as 13 outwardly, away from the clutch operating mechanism. This tendency of the levers to move outwardly under the force of the spring 16 is checked by a connection with the fly wheel 1 for each lever. Specifically, I have provided in cooperation with each lever a simple bracket such as indicated by the reference numerals 22, 23 and 24. Each of these brackets is attached to the fly wheel by means of the screws or bolts 25—26, 27—28 and 29—30, respectively. Each bracket is provided with an opening through which the corresponding extension on the pressure plate can pass as is shown in the drawings. The lever which is pivoted on the corresponding extension of the pressure plate 12 also passes through the bracket and is pivotally connected therewith.

For example, the section 32 of the lever 13 as shown in Figure 1 is located so as to cooperate with bracket 22. This lever is pivoted by means of the pin 31 on the extension 19 of the pressure plate 12 which passes through the bracket 22. Accordingly, when the spring 16 exerts a force to move the lever 13 (and with it the other levers 14 and 15 outwardly away from the clutch mechanism) the pivotal section 32 of the lever 13 and corresponding sections of the other levers will pivotally engage the brackets such as 22.

The pressure plate 12 will be depressed against the friction member 11 of the driven member 9, and the friction member 10 will engage the friction surface of the fly wheel 1. The driven shaft 3 will now be coupled directly in direct driving force with the fly wheel 1.

Now, when it is desired to disengage the clutch, a certain mechanism will be operated and will cause the actuation of the lever bracket 33 shown in Figure 1 which is adapted to move the thrust bearing 34. The thrust bearing 34 will be moved against the levers 13, 14 and 15 and will depress these levers against the force of the spring 16. The section 32 of the lever 13, and corresponding sections of the other levers 14 and 15, will pivot on the brackets 22, 23 and 24, respectively, and the pressure plate 12 will therefore be lifted off from engagement with the friction member 11 of the driven plate 9. Accordingly, the friction plate 9 will disengage the friction surface of the fly wheel 1 and the transmission of the direct driving force to the driven shaft will be discontinued. The clutch is then disengaged.

The driven shaft 3 is journaled at its other end in the bell housing 35 in a bearing indicated by the reference numeral 36. Numeral 37 indicates a means for lubricating the thrust bearing 34 and the related parts.

It will be observed that the levers 13, 14, and 15, and the extensions on the pressure plate cooperate with the brackets or cover to hold the several clutch parts assembled in proper relation, even when detached from the driving member or flywheel.

It will be understood that several modifications could be devised for changing the embodiment which I have above described. For example, the extensions such as 19, 20 and 21 on the pressure plate 12 instead of being integral cast parts of the pressure plate could be made of separate members mounted on the pressure plate. This modification, of course, is within the limits of the structure which I have shown. Several other changes could be made without introducing any novelty over the structure described above.

The following discussion of the other embodiments need not be detailed as the description of the above explained structure. Several elements are now well known and I will therefore confine the following discussion chiefly to the distinctions and differences of the other embodiments over the embodiment shown in Figures 1, 2, and 3.

Referring now to Figures 4 and 5, the clutch structure shown in these figures comprises again a fly wheel, a driven plate adapted to be brought into frictional engagement with a friction surface on the fly wheel and attached to a hub member which is mounted on a splined section of the driven shaft designated in the drawings, Figure 4, by the numeral 40. The engagement and disengagement of the driven plate with the fly wheel may again be accomplished by means of a pressure plate such as 41 which corresponds to the pressure plate 12 described in connection with the previous embodiment. The spring 42 is mounted on the pressure plate in a similar manner as already discussed, namely, on projections such as 43 and 44 which extend radially from the inner portion of the pressure plate 41.

In the previous case, I have shown a pressure plate having extensions which project radially in a lateral direction from its outer portion. The pressure plate 41, on the other hand, is provided with pairs of projections 45—46, 47—48, 49—50 which extend axially from the outer portion of the pressure plate. Pivotally mounted on these projections of the pressure plate 41 are levers designated in Figures 4 and 5 of the drawings by the numerals 51, 52 and 53. Specifically, mounted in the projections 45—46 by means of a pin 54 is the lever 51; mounted pivotally in the projections 47—48 by means of a pin 55 is the lever 52; and mounted pivotally in the projections 49—50 by means of a pin 56 is the lever 53. These levers extend substantially radially inwardly with respect to the pressure plate 41 toward the center of the clutch mechanism.

Mounted between the inner ends of the levers 51, 52 and 53 and the projections such as 43 and 44 on the inner portion of the pressure plate 41 is the spring 42.

So far, in its elements, the structure shown in Figures 4 and 5 corresponds broadly to the structure already described with reference to Figures 1, 2, and 3.

It will be recalled that I have shown, in the previous embodiment, abutments cooperating individually with the various levers. In case of the structure shown in Figures 4 and 5, however, I have provided a cover 57 which may be attached to the fly wheel by means of the bolts 58 to 65, inclusive. Wings or ears such as 66—67, 68—69 and 70—71 may be stamped out from the cover 57 as shown in the drawings, and each pair of these ears is provided with openings which register with each other and provide for the pivotal connections of the corresponding levers 51, 52 and 53 with the fly wheel. Lever 51, for example, cooperates with the ears 66—67; lever 52 cooperates with the ears 68—69; and lever 53 cooperates with the ears 70—71. Each lever is provided with an elongated opening which may be brought to register with the openings in the corresponding pairs of ears and a pin passes through the openings in each pair of ears and through the elongated opening in the corresponding lever, holding the corresponding lever in engagement with the corresponding ears. The pin 68' thus holds the lever 51 in engagement with the ears 66—67. Similar pins hold the levers 52 and 53, respectively, in engagement with the ears 68—69 and 70—71, respectively.

I have shown these ears or wings stamped out from the material of the cover 57. It will be understood, of course, that this is merely one way of making the ears. They may also be formed by brackets attached to the cover separately at the requisite places where they are required.

Adjacent to each pair of ears 66—67, 68—69 and 70—71 on the cover 57 are openings for the passage of the corresponding extensions 45—46, 47—48 and 49—50 of the pressure plate 41.

Thus, the feature which is common to all the embodiments shown in this specification, namely, the pressure plate passing through fixed members or brackets appears also in this embodiment, Figures 4 and 5. It will be understood, of course, that one of the essential functions of the cover 57 is to provide pivotal connections for the various levers 51, 52 and 53. In other words, as has been said before, the fixed members have merely spread out until they have become a cover for the clutch.

Now, as to the operation of the clutch shown in Figures 4 and 5, as far as the same has been described above, the same is as follows:

The clutch is shown in Figure 4 in the position of clutch engagement. The pressure of the spring 42 tends to move the levers 51, 52 and 53 outwardly, away from the mechanism and, since each of these levers is connected with the corresponding ears by means of the pins such as 68', the pressure plate 41 to which the levers are pivoted will be depressed against the friction member of the driven plate. The latter in turn will be depressed, with its friction member against the friction surface of the fly wheel. The driving force of the fly wheel will be directly transmitted to the driven shaft 40 in the same manner as was already discussed in connection with previous embodiments.

When it is desired to disengage the clutch, the lever bracket mechanism diagrammatically indicated in Figure 4 by the reference numeral 72 will be actuated to move the thrust bearing 73 in a direction toward the inner ends of the operating levers 51, 52 and 53, whereby these levers will be depressed against the force of the spring 42. The pressure plate 41, on which the levers are pivoted will be lifted off and out of engagement with the friction member of the driven plate, thereby also releasing the driven plate from driving engagement with the friction surface of the fly wheel. The transmission of the driving force to the driven shaft 40 will be discontinued. The clutch is then disengaged.

The driven shaft 40 is also rotatably journaled in the bell housing designated by the numeral 74, in the bearing shown at 75. Numeral 76 indicates a pipe connection for lubricating the thrust bearing 73 and the related parts.

The clutch mechanism above described may be modified in various ways within the scope of my teaching. For example, my invention is not to be limited to the provision of only one coiled spring such as 42. Likewise, as has already been intimated previously, instead of stamping the ears such as 66—67, 68—69, 70—71, out from the cover as is shown in Figures 4 and 5 of the drawings, separate brackets may be provided and individually attached in pairs to the cover plate. It is not even necessary to provide pairs of ears. A single bracket having a corresponding opening for engaging the pin or section of the corresponding lever, or having suitable projections for accomplishing this result will suffice. Numerous other changes and modifications may be devised.

The embodiment of the invention previously described with reference to Figures 1 to 3, inclusive, represents an open clutch mechanism in which the heat of slippage can readily be radiated. Due to the mounting of the spring between projections of the pressure plate and the inner ends of the levers the area of contact is reduced to a minimum so that heat production is also reduced to a great extent. This design with a view to heat radiation has been made with a view to clutch cooling.

The problem of clutch cooling may be divided into two classes. The clutch parts may be so designed that they will lend themselves to efficient radiation and they may be formed so that they will circulate the air within the bell housing in such a way that it will remove heat produced in the course of the operation of the clutch. Fins and the like may be added to the moving parts for forcing a draft.

The first described embodiment (Figures 1 to 3) of the clutch mechanism and also certain embodiments yet to be described have been designed specifically with the thought of reducing the production of heat and of efficiently radiating the heat. They satisfy therefore the requirement of the first class of constructions designed with a thought of the cooling problem by efficient heat radiation. The structure which is shown in Figures 4 and 5, in addition to having its parts designed so that they will lend themselves to efficient heat radiation, also discloses provisions for circulating the air within the bell housing in order to remove heat produced therein. There are various methods of introducing a flow of air from the outside to the clutch and through the bell housing. In the embodiment of the clutch shown in Figures 4 and 5 I have shown certain provisions for accomplishing this result and I will now describe the provisions specifically in detail.

The cover 57, as will be seen particularly from Figure 5, is formed at certain portions thereof with vanes or the equivalent so as to catch the air and to circulate the same, that is, to force the air into the interior of the clutch and circulate the same through the bell housing for cooling purposes. These portions are designated in Figure 5 by the numerals 77, 78, and 79. It will be seen, particularly from the sectional view shown in Figure 7 which is taken on the line 7—7 of Figure 5, that the portion 77 of the cover 57 is pressed out to form a hump. This pressed out portion 77 is disposed adjacent the stamped out ears 66 and 67 across the width of the cover 57. The side of the cover at this pressed out portion 77 is pressed out laterally and provides an opening in the cover. This opening, in connection with the portion 77, is designated in Figure 5 by the numeral 80, and the condition will be better understood from an examination of the drawings Figure 6, which is a section taken along the line 6—6 of Figure 5.

Referring now to Figure 6, the cover 57 is shown attached to the fly wheel, and covers the pressure plate 41. The material is pressed out from the cover transversely and laterally thereto and the lateral portion is formed into an opening 80. The air will therefore catch in this opening 80 when the clutch rotates with its cover 57, and will be deflected along the inner surface of the portion 77 downwardly against the pressure plate, the portions 77—79 thus serving as channels or conduits for forcing the air into the clutch mechanism and cooling the same.

The louver portions 78 and 79 are similar to the portion 77, each provided with such a flaring opening as 80. The openings in connection with the portions 78 and 79 are designated in Figure 5 by the numerals 81 and 82.

It will be seen from the above description of the louver provision that this particular embodiment satisfies the requirement of clutch cooling in two ways. In the first place, the clutch is designed in all its parts so that efficient radiation will be achieved and it also has provisions for forcing and circulating the air along the operating parts of the clutch and thereby cooling the same. This clutch therefore combines the principles of clutch cooling in accordance with two distinct classes. The previously described clutch shows the principles of clutch cooling incorporated in the design of all parts so as to inhibit the production of heat and to radiate heat efficiently. The clutch constructions described below are designed on the same principle.

Continuing the discussion with reference to the construction shown in Figures 8, 9, and 10, I have shown in these figures a clutch mechanism having an angle type of bracket cooperating with the pressure plate and with the levers, and disposed so that the diametral clutch clearance is increased.

Numeral 83 in Figures 8, 9, and 10 designates the pressure plate. On the inner portion of the pressure plate are provided supporting members such as 84 and 85 for supporting one end of the operating spring 86. This pressure plate is again provided with projections or ears such as 87—88, 89—90 and 91—92. Pivotally mounted on each pair of these projections are operating levers 93, 94 and 95, respectively. The inner ends of these levers are formed in the shape of hooks as particularly shown in Figure 8, and hold the other end of the operating spring 86. Thus, the operating spring 86 is disposed directly between the pressure plate 83 and the levers 93, 94 and 95 with no other parts included between the same. Due to the projections such as 84 and 85 on the inner portion of the pressure plate 83, which support the spring 86 at one end thereof, the area of contact between the spring and the pressure plate 83 is reduced to a minimum, reducing the possibility of heat transfer, and due to the general structure and function of the other parts, a good and efficient heat radiation is accomplished.

Each of the operating levers is pivotally connected with a bracket carried by the fly wheel. For example, the lever 93 is pivoted, as at 96 on an extension such as 97 of a bracket such as 98 attached to the fly wheel by means of the bolts such as 99 and 100. Each of these brackets has an opening, as is particularly seen in connection with the bracket 98 shown in Figure 8, through which the extension on the pressure plate 83 can pass. The bracket extension such as 97 has an opening for the passage of the corresponding lever such as 93.

The operation of the clutch mechanism shown in Figures 8, 9, and 10 is substantially the same as already described in connection with previous clutch constructions and need not be repeated. The principal structural feature of the clutch last described resides in the arrangement of the abutment 98 relative to the pressure plate and to the lever in such a manner that the diametral clutch clearance is increased.

In Figures 11, 12, and 13 I have shown a clutch construction in which separate driving pins are provided while the angle type brackets are used merely as a means for pivotally connecting the levers with the fly wheel when the operating levers are moved to engage or to release the clutch.

Referring now to Figures 11, 12, and 13, the brackets 105, 106 and 107 cooperate with the levers 108, 109 and 110. These brackets are fastened to the fly wheel by means of bolts such as 111 shown in connection with the abutment 105. Extensions on the pressure plate 112 pass through these brackets in the same manner as described for example in connection with Figures 1 and 2. These extensions are designated in the drawings by the numerals 113, 114 and 115. The levers 108, 109, and 110 are pivoted at their outer ends on the extensions of the pressure plate designated 113, 114, and 115, in the usual manner, by means of pins such as 116 shown in connection with the lever 108 and the extension 113. Supported between the pressure plate and the inner ends of the levers is the operating spring 117. The support for this spring is again made in such a manner as to reduce the area of contact and thereby inhibit the production and transfer of heat. The cooperation of the individual parts of the clutch mechanism is such as to promote heat radiation.

The engaging and disengaging operation of the clutch mechanism shown in Figures 11, 12, and 13 is substantially the same as that already described in connection with previously discussed embodiments and will therefore not be repeated.

The brackets discussed with the previous embodiments of the invention had a dual function. They served as driving members for the pressure plate and also as pivotal supports for the levers. In the embodiment shown in Figures 11, 12, and 13, above described, these abutments have merely the function of pivotally connecting the levers with the fly wheel while the driving function is reserved for separate drive pins. The brackets in this case, are therefore designed smaller and each bracket is attached to the fly wheel only by a single bolt.

The driving pins are designated in the drawings by the numerals 118, 119, and 120. Each of these driving pins is attached to the fly wheel as is particularly shown in connection with the driving pin 119 shown in Figure 11 and projects from the fly wheel into a slotted extension of the pressure plate 112. In other words, there are pairs of ears such as 121—122, 123—124 and 125—126 provided on the pressure plate which form slotted extensions projecting laterally therefrom. The driving pins 118, 119, and 120 which are disposed in the slotted extensions, respectively, being firmly attached to the fly wheel will take care of the driving function for the pressure plate.

It will be seen from the above description that the several embodiments which I have disclosed show numerous novel features. I will briefly enumerate and summarize these features so that they may be easily recalled when the appended claims are read.

Several features recur in every embodiment and are therefore common to all embodiments, namely:

The feature of the pressure plate passing through the abutments;

The feature of mounting the operating spring so as to reduce the area of contact between the pressure plate and the spring;

The feature of unitary assembly whereby the brackets secure the several parts in assembly when dismounted from the fly wheel;

The elimination of all parts between the spring and the levers;

The general simplicity of design which reduces the production costs and efficiency of operation; and The feature of designing and disposing all parts so as to provide for good heat radiation.

In addition to the above features which are common to all embodiments, I have shown the following improvements:

The feature of pivotally mounting the levers within the actual cast part of the pressure plate;

The feature of combining the brackets with the cover for the clutch;

The feature of providing louvers for forcing a draft into the interior of the clutch and thereby cooling the same;

The feature of increasing the diametral clutch clearance with simple means; and

The feature of providing separate driving pins and brackets whereby the driving pins transmit driving force to the pressure plate, while the brackets serve merely as points of pivotal connection for the levers.

The levers and also the brackets have been designed so as to reduce the cost of production while improving the quality of the product. The levers may be stamped out from suitable stock so that most of the usual machine work is eliminated. The fulcrum points and other wearing surfaces may be treated suitably so as to increase durability. The same may be done with the brackets.

The embodiments which I have shown and described in this case are not intended to show the limitations of the various inventive ideas incorporated therein. Several changes may be devised without altering the scope of my invention. For example, instead of providing only one coiled spring as I have shown, several such springs may be used in connection with any of the clutches described. The various operating parts of the clutch mechanism may be assembled separately and then mounted as a unit on the pressure plate. These and other modifications may be devised, and, I therefore want to have it understood that I do not desire to be limited precisely to the structures which I have shown and described but only to the scope and meaning of the following claims in which I have defined what I believe is new and distinguishing over the art.

What I claim as my invention is:

1. The assembly of a clutch operating mechanism, comprising a plurality of brackets each having an opening therein, a pressure plate, means thereon extending through said openings, operating levers pivoted on said pressure plate and also extending through said openings, said first named means and said levers cooperating with the openings in said brackets to hold said mechanism in unitary assembly.

2. The assembly of a clutch operating mechanism, comprising brackets, a pressure plate having extensions passing through said brackets, levers mounted pivotally on said extensions, and spring means disposed solely between said pressure plate and said levers.

3. The assembly of a clutch operating mechanism, comprising brackets, a pressure plate having extensions passing through said brackets, levers mounted pivotally on said extensions, abutment means on said brackets cooperating with said levers as fulcrum means therefor, and spring means disposed solely between said pressure plate and said levers and reacting against said levers.

4. In an open clutch of the class described, a circular ring shaped pressure plate, radial extensions in the inner portion of said pressure plate, projections on the outer portion of said plate and disposed in the plane thereof, levers pivotally mounted on said projections, and spring means disposed between said radial extensions and said levers.

5. In a clutch, the assembly of an operating mechanism, comprising a pressure plate, cooperating levers and spring means carried by said pressure plate, a cover for said clutch, and means pivotally connecting the intermediate portions of said levers with said cover.

6. In a clutch having a driving member, the assembly of an operating mechanism, comprising a pressure plate, cooperating levers and spring means carried by said pressure plate, abutment means for attachment to said driving member cooperating with said levers as fulcrums therefor, and vanes for catching and forcing air through said mechanism for cooling the same.

7. In a clutch having a driving member, an operating mechanism, comprising brackets for attachment to said driving member, a pressure plate, mounting means on said pressure plate extending through said brackets, levers on said mounting means, separate openings in said brackets, said levers extending through said separate openings and being fulcrumed therein, and spring means disposed between said pressure plate and said levers.

8. In a clutch mechanism having a driving member, a pressure plate, levers thereon, brackets mounted on said driving member and with which said levers are pivotally connected, lateral extensions on said pressure plate and disposed in the general plane thereof, and projections on said driving member cooperating with said lateral extensions solely for transmitting driving force from said driving member to said pressure plate.

9. In a clutch having a driving member, a pressure plate, mounting means projecting from the outer portion of said pressure plate and substantially perpendicularly thereto, a lever pivotally mounted on each of said mounting means and extending radially of said pressure plate toward the center thereof, bracket means for attachment to said driving member outside of said pressure plate, each of said mounting means extending through a corresponding bracket means, an extension on each of said bracket means, and means in said extension for receiving a corresponding lever at the fulcrum portion thereof.

10. In a clutch having a driving member, a pressure plate, a plurality of levers carried by said pressure plate and extending radially from the periphery of said pressure plate toward the center of said clutch, spring means cooperating with said levers, each lever having a fulcrum portion disposed outside said pressure plate midway between the outer and inner margin thereof, bracket means for attachment to said driving member, one for each of said levers, and abutment means on each of said bracket means cooperating with the fulcrum portion of the corresponding lever.

11. In an open clutch of the class described, including a fly wheel and a driven member for frictional engagement therewith, the unitary assembly of a mechanism for effecting said engagement selectively, comprising a pressure ring, a spiral spring, a plurality of central projections in said pressure ring for supporting said spring, radial extensions on the peripheral portion of said pressure ring, a plurality of levers movably mounted directly on said extensions, said levers extending in a general direction toward the center of said pressure ring and contacting directly with said spring, angle brackets secured to the fly wheel and providing a pivotal support for said levers, means including said brackets for mounting said unitary assembly on said fly wheel, and a thrust bearing for actuating said levers to move said pressure ring relative to said driven member.

12. In a clutch, a ring for effecting selective frictional engagement between a driving member and a driven member, radial projections in said ring, spring means supported on said projections centrally of said ring, radial projections on the periphery of said ring and integral therewith, levers mounted on said peripheral projections, said levers extending centrally of said ring and engaging said spring means.

13. In a clutch, a pressure ring for effecting selective frictional engagement between a driving member and a driven member, radial projections in said ring, spring means supported on said projections centrally of said ring, radial projections on the periphery of said ring and integral therewith, levers mounted on said peripheral projections, said levers extending centrally of said ring and engaging said spring means, fulcrum means for each of said levers, and means for attaching said fulcrum means to said driving member.

14. In a clutch of the class described, having a driving member, a driven member, and a pressure plate for effecting engagement and disengagement of said driven member relative to said driving member, levers on the pressure plate, means on the plate providing pivotal support for the levers on said pressure plate, spring means disposed between said pressure plate and said levers, and angular bracket means each having one leg attached to said driving member and the other leg cooperating with the means on the pressure plate for transmitting rotation thereto.

15. In a clutch, a driven member, a driving member, a pressure plate, spring means carried thereon, levers supported by said pressure plate, said spring means reacting against said levers, means for movably connecting said levers to said driving member, and means comprising a cover carried by the driving member and provided at its circumferential portions with vanes for creating a draft to cool said clutch.

16. A clutch comprising, in combination, a driving member, a driven member, a pressure plate having outwardly projecting extensions, lever means mounted on said extensions, angular brackets secured to the driving member and including portions embracing said extensions to provide a driving connection between the driving member and the pressure plate, and means pivotally connecting said lever means with said brackets at points spaced radially inwardly with respect to the points of connection between the lever means and said pressure plate.

17. A clutch comprising, in combination, a driving member, a driven member, a pressure plate having outwardly projecting extensions, levers mounted on said extensions and having their inner ends disposed adjacent the axes of said driving and driven members, bracket means secured to the driving member outwardly of the pressure plate and including portions disposed to overlie the pressure plate and embrace said extensions, whereby a driving connection is established between the driving member and the pressure plate, means providing for a pivotal connection between the levers and the radially inner portions of said bracket means, and spring means disposed between the pressure plate and the inner ends of said levers.

18. A clutch comprising a driving member, a driven member, a driven plate interposed between said members, a cover secured to said driving member and embracing said driven member and plate, vanes carried by the peripheral portions of said cover for creating a draft to cool the clutch, and means serving as channels for directing said draft inwardly of said cover.

19. In a clutch mechanism, a driving member; a driving clutch plate; means associated with said driving member for causing said driving clutch plate to rotate with said driving member and permit axial movement thereof for clutching and declutching purposes, said means comprising a plurality of apertured members secured to the face of said driving member, and adapted to limit movement of said plate away from said driving member.

20. In a clutch mechanism, a driving member; a driving clutch plate having projections associated therewith; and means associating said clutch plate with said driving member for rotation therewith and for movement axially thereof for clutching and declutching purposes; said means comprising a plurality of slotted members secured to the face of said driving member and through which said projections extend, said slotted members being adapted to limit movement of said plate away from said driving member.

21. In a clutch mechanism, a driving member; a driving clutch plate having ears formed thereon; means associating said clutch plate with said driving member for rotation therewith and for movement axially thereof for clutching and declutching purposes, spring means urging said clutch plate into clutching position; means for withdrawing said clutch plate into disengaged position against the action of said spring means; and common means for supporting said last named means and for causing rotation of said driving clutch plate with said driving member, comprising a plurality of apertured members secured to the face of said driving member and through which said ears and said withdrawing means extend.

22. In a clutch mechanism, a driving member; a driving clutch plate; spring means urging said driving clutch plate into engaged position; lever means for withdrawing said driving clutch plate into disengaged position against the action of said spring means; and means fulcruming said lever means upon said driving member comprising a plurality of apertured members having fulcruming faces and secured to said driving member and through which said lever means extend.

23. In a clutch mechanism, a driving member; a driven member; a plurality of levers pivoted at their outer ends and having converging inner ends and associated with said driving member for causing clutching and declutching movements thereof; and spring means urging said driving member into frictional engagement with said driven member; said spring means being supported at one end adjacent to and by the converging inner ends of said levers in such manner that said spring means are substantially centered by said levers while holding said levers tight during rotation of the clutch mechanism regardless of slight variations in the movements of the levers due to irregularities and inaccuracies of the mechanism.

24. In a clutch mechanism, a driving member; a driving clutch plate having ears formed thereon; means associating said clutch plate with said driving member for rotation therewith and for movement axially thereof for clutching purposes; spring means urging the clutch plate into clutching position; means for withdrawing said clutch plate into disengaged position against the action of said spring means; and common means for supporting said last named means and for causing rotation of said driving clutch plate with said driving member, comprising a plurality of apertured members secured to the face of said driving member and through which said withdrawing means extend.

25. In a clutch mechanism, a supporting structure mounted for rotation and having a frictional surface; a member mounted for axial movement toward and away from said frictional surface; a plurality of levers extending across the face of said member remote from said frictional surface; means associated with said structure and said member for restraining said levers against bodily outward movement and for permitting rocking, force transmitting movements thereof; axially extending resilient means exerting forces upon the inner ends of said levers and adapted to thereby urge said member toward said frictional surface; the portion of said resilient means adjacent said levers being solely supported and restrained against radial displacement by the inner ends of said levers.

26. The mechanism described in claim 25, wherein that portion of said resilient means which is axially remote from the inner ends of said levers is adapted to apply forces to said member.

27. The device set forth in claim 25, wherein said resilient means comprise a single compression spring.

28. In a clutch mechanism, in sub-combination, a rotatable supporting member; a driving member mounted for axial movement; means for establishing a driving connection between said rotatable support and said member comprising a plurality of driving lugs associated with one of said members and adapted to cooperate with driving faces provided on said other member; and a plurality of levers pivotally connected to said driving lugs and adapted to fulcrum against surface portions provided on said other member for producing movement of said driving member in one direction.

29. The mechanism described in claim 28, wherein said lugs are provided on said driving member.

30. The mechanism described in claim 28, together with a second set of fulcrum surfaces against which said levers are adapted to react for producing movement of said member in a direction opposite to said first named direction.

31. In a clutch mechanism, in sub-combination, a frictional clutch plate adapted to have heat generated therein during operation; spring means adapted to resiliently urge said plate in one direction; and thermal isolating means for minimizing the transfer of heat from said plate to said springs, comprising elements associated with said plate and which are adapted to contact relatively small areas of said spring means.

32. The mechanism described in claim 31, wherein said plate is annular in form and telescopes said spring means, said isolating means being adapted to space said spring means from the inner wall of said plate.

33. In a clutch mechanism, in sub-combination, a plate having driving lugs projecting outwardly therefrom; levers associated with said plate and connected to said driving lugs by pivot means; a member associated with each of said lugs and having a driving surface engaging said driving lugs, said member embracing the ends of the associated lug and lever.

34. In a clutch, the combination of two engaging members, one of said members including spring receiving seats, an expansible spring carried on said seats, levers pivoted to said member and reacting against the spring, and means acting between said member and said levers for limiting the outward movement of the latter under the influence of the spring when the two members are separated.

GEORGE I. GOODWIN.